US008678442B2

(12) United States Patent
Bergsmann et al.

(10) Patent No.: US 8,678,442 B2
(45) Date of Patent: Mar. 25, 2014

(54) FORGERY-PROOF SECURITY ELEMENT WITH COLOR SHIFT EFFECT

(75) Inventors: Martin Bergsmann, Linz (AT); Friedrich Kastner, Grieskirchen (AT); Jürgen Keplinger, Perg (AT); Georg Bauer, Fraham (AT); Harald Walter, Schwabach (DE)

(73) Assignee: Hueck Folien GES.m.b.h., Baumgartenberg (AT)

( * ) Notice: Subject to any disclaimer, the term of this patent is extended or adjusted under 35 U.S.C. 154(b) by 0 days.

(21) Appl. No.: 13/195,985

(22) Filed: Aug. 2, 2011

(65) Prior Publication Data

US 2011/0291401 A1 Dec. 1, 2011

Related U.S. Application Data

(62) Division of application No. 10/587,074, filed as application No. PCT/EP2005/001385 on Feb. 11, 2005, now abandoned.

(30) Foreign Application Priority Data

Feb. 16, 2004 (AT) .................................. A 236/2004

(51) Int. Cl.
*B42D 15/00* (2006.01)
*G02B 5/08* (2006.01)
*G02B 7/182* (2006.01)

(52) U.S. Cl.
USPC ................. 283/72; 283/83; 283/91; 359/584; 359/589

(58) Field of Classification Search
USPC ........... 283/83, 85, 91, 92, 109–110, 114, 72; 359/584, 588, 589
See application file for complete search history.

(56) References Cited

U.S. PATENT DOCUMENTS 4,792,667 A * 12/1988 Chen ............................ 235/488
5,278,590 A 1/1994 Phillips et al.
6,565,770 B1 5/2003 Mayer et al.
7,322,530 B2 1/2008 Walter et al.
7,396,557 B2 7/2008 Bauer et al.
7,699,350 B2 * 4/2010 Heim .............................. 283/91
2004/0050269 A1 3/2004 Adamczyk et al.
2005/0104364 A1 * 5/2005 Keller et al. .................... 283/72
2005/0151368 A1 7/2005 Heim
2007/0273144 A1 * 11/2007 Phillips et al. .................. 283/72

FOREIGN PATENT DOCUMENTS

WO 02/18155 A2 3/2002
WO 03/016073 A1 2/2003
WO WO03068525 * 8/2003

OTHER PUBLICATIONS

International Search Report issued Aug. 8, 2005 in International (PCT) Application No. PCT/EP2005/01385.

* cited by examiner

*Primary Examiner* — Kyle Grabowski
(74) *Attorney, Agent, or Firm* — Wenderoth, Lind & Ponack, L.L.P.

(57) ABSTRACT

A tamper-proof security element includes at least one polymer spacer layer and two metal cluster layers. One or more of the layers, in addition to their function, fulfills a security feature in their color-shift set-up.

31 Claims, 3 Drawing Sheets

FORGERY-PROOF SECURITY ELEMENT WITH COLOR SHIFT EFFECT

This application is a divisional of Ser. No. 10/587,074, filed Jul. 21, 2006, now abandoned which is a National Stage Application of International Application Serial No. PCT/EP2005/001385, filed Feb. 11, 2005.

The invention relates to forgery-proof security features, which exhibit a color shift effect caused by metal clusters which are separated by a defined transparent layer from a mirror layer.

WO 02/18155 discloses a method for the forgery-proof marking of objects, wherein the object is provided with a marking comprised of an electromagnetic wave-reflecting first layer, onto which a layer permeable to electromagnetic waves with a defined thickness is applied, whereupon onto this layer a third layer formed of metal clusters follows.

SUMMARY OF THE INVENTION

The aim of the invention is to provide a security feature with a color shift effect, wherein the security feature is to have additional security stages.

Subject matter of the invention is therefore a forgery-proof security feature comprising in each instance at least one layer reflecting electromagnetic waves, a polymeric spacer layer and a layer formed of metal clusters, characterized in that one or several of the layers, in addition to their function in the color shift effect setup, satisfy further security functions.

1 the optically transparent carrier substrate,

2 the electromagnetic wave-reflecting first layer,

3 the polymeric spacer layer,

4 the layer built up of metal clusters,

5 an adhesion or lamination layer,

6 a protective (lacquer) layer,

7 a transfer lacquer layer,

8 a black layer,

10 the path of the rays of the incident and reflected light.

Figure 1:
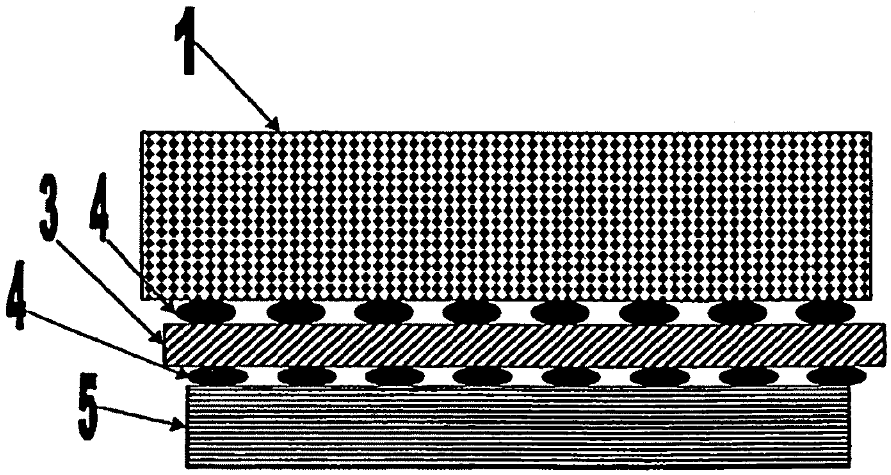
In FIGS. 1 to 6 examples of the security features according to the invention are depicted. Therein indicate
Figure 2:
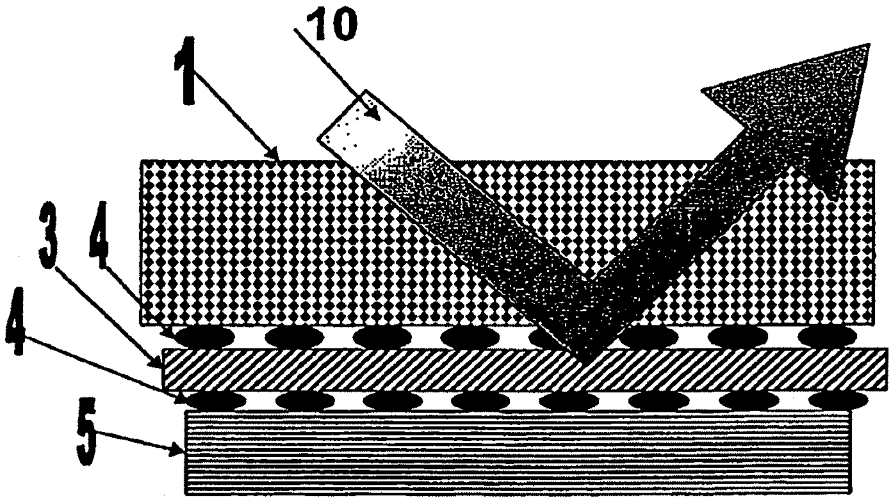
Figure 3:
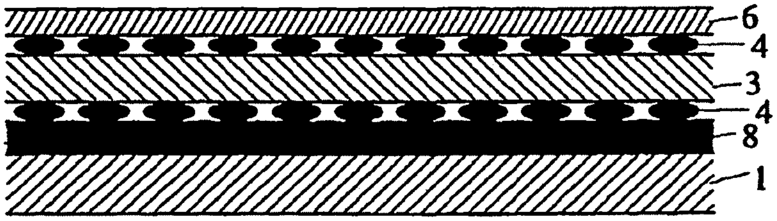
Figure 4:
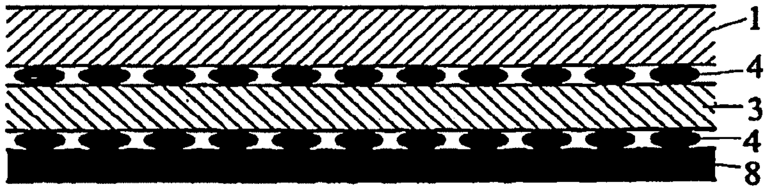
Figure 5:
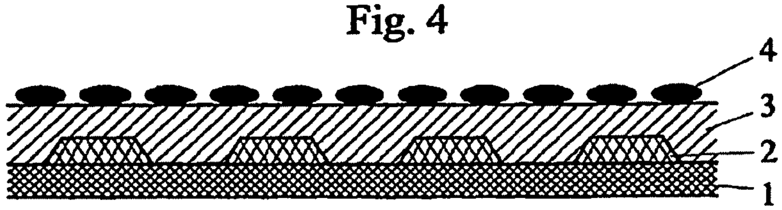
Figure 6:
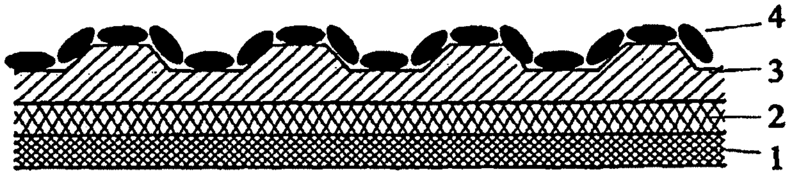
Figure 7:
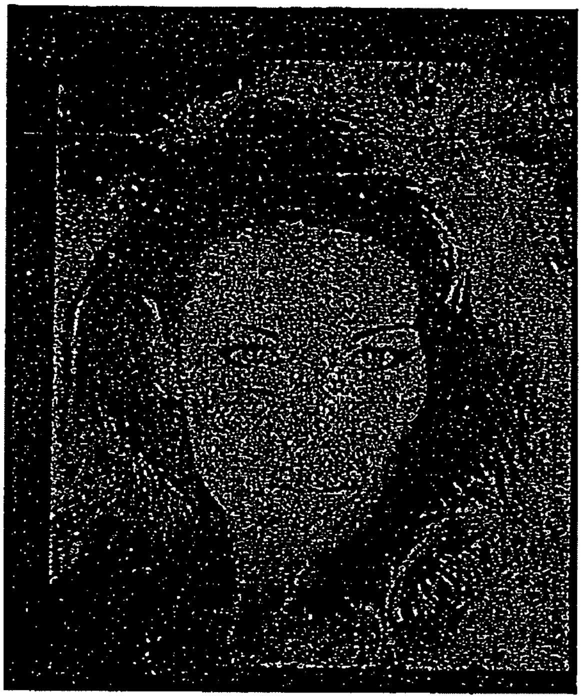

FIG. 1 illustrates a schematic cross sectional view of a first permanently visible marking on a sheet with double cluster setup, FIG. 2 illustrates a schematic cross sectional view of a first permanently visible marking on a sheet with double cluster setup and the optic path of the optical detection means, for example spectrometer, color measuring device or the like, FIG. 3 illustrates a direct double cluster setup with black background, FIG. 4 illustrates an indirect double cluster setup with black background, FIG. 5 illustrates a setup with partial reflection layer, FIG. 6 illustrates a setup with a structured spacer layer of different thickness, and FIG. 7 illustrates a system personalized by electromagnetic radiation.

DETAILED DESCRIPTION OF THE INVENTION

Carrier substrates 1 to be considered are preferably flexible sheets of synthetic materials, for example of PI, PP, MOPP, PE, PPS, PEEK, PEK, PEI, PSU, PAEK, LCP, PEN, PBT, PET, PA, PC, COC, POM, ABS or PVC. The substrate sheets preferably have a thickness of 5-700 μm, preferably 8-200 μm, and especially preferred a thickness of 12-50 μm. The sheets can be clear or matt-finished (in particular matt-imprinted). The scattering on matt sheets causes a marked change, in particular of the intensity in the color spectrum, such that a color code different than in clear sheets is generated.

Further, metal sheets, for example Al, Cu, Sn, Ni, Fe or special steel sheets having a thickness of 5-200 μm, preferably 10-80 μm, and especially preferred 20-50 μm, can also serve as the carrier substrate 1. The sheets can also be surface-treated, coated or laminated, for example with synthetic materials, or they can be lacquered.

Further, as carrier substrates can also be utilized cellulose-free or cellulose-containing paper, thermally activatable paper or composites with paper, for example composites with synthetic materials with a grammage of 20-500 $g/m^2$, preferably 40-200 $g/m^2$.

The carrier substrate can also be provided with a release-capable transfer lacquer layer.

Onto the carrier substrate 1 is applied a layer reflecting electromagnetic waves 2. This layer 2 can preferably be comprised of metals, such as for example aluminum, gold, chromium, silver, copper, tin, platinum, nickel or tantalum, of semiconductors, such as for example silicon, and their alloys, for example nickel/chromium, copper/aluminum and the like or a printing ink with metal pigments.

The electromagnetic wave-reflecting layer 2 can be applied over the entire surface or only partially using known methods, such as spraying, vapor deposition, sputtering, for example as printing ink, with known printing methods (gravure, flexographic, screen or digital printing), lacquer coating, roller spreading methods, slot eye, roll dip coating or curtain coating and the like.

For a partial application, a method utilizing a soluble color application for the production of the partial metallization is especially suitable. In this method in a first step a color application soluble in a solvent is applied onto the carrier substrate, in a second step this layer is optionally treated by means of an inline plasma, corona or flame process, and, in a third step, a layer of the metal or metal alloy to be structured is applied, whereupon in a fourth step the color application is removed by means of a solvent, optionally combined with mechanical action.

The soluble color application can be all-over or partial, and the application of the metal or of the metal alloy takes place over the entire surface or partially.

However, the partial electromagnetic wave-reflecting layer can also be produced employing a conventional known etching method.

The thickness of the electromagnetic wave-reflecting layer is preferably approximately 10-50 nm, however, greater or lesser layer thicknesses are also possible.

If metal sheets are utilized as the carrier substrate, the carrier substrate itself can already form the electromagnetic wave-reflecting layer.

The reflection of this layer for electromagnetic waves, in particular as a function of the thickness of the layer or of the metal sheet utilized, is preferably 10-100%.

The polymeric spacer layer 3 or the polymeric spacer layers succeeding thereon can also be applied over the entire surface or preferably partially.

The polymeric layers are for example comprised of conventional or radiation-curing, in particular UV-curing, color substance and lacquer systems based on nitrocellulose, epoxy, polyester, colophonium, acrylate, alkyd, melamine, PVA, PVC, isocyanate, urethane or PS copolymer systems.

This polymeric layer 3 serves essentially as a transparent spacer layer, however, depending on the composition, may in a certain spectral range be absorbing and/or fluorescing or phosphorescing. This property can optionally also be enhanced by adding a suitable chromophore. A suitable spectral range can be selected through the selection of different chromophores. Thereby, in addition to the shift effect, the polymeric layer can additionally also be made machine-readable. For example, in the blue spectral range (in the proximity of approximately 400 nm) a yellow AZO coloring agent can also be utilized, for example anilides, rodural or eosin. The coloring agent moreover changes the spectrum of the marking in a characteristic manner.

When using a fluorophore with excitation outside of the visible range (for example in the UV range) and irradiation in the visible range, with the choice of a suitable concentration, a marking can even be generated with color change on illumination. The layer structuring has optimally at the aimed for observation angle a spectrum with high absorption in the wavelength range of the emission of the fluorophore. Such a marking could further be readily combined with the UV test lamps at cash registers, which are already currently in use.

A further feasibility for generating a reversible color change comprises utilizing a switchable chromophore, such as for example bacteriorhodopsin. When illuminated with a suitable wavelength (bacteriorhodopsin between 450 mm and 650 mm) and sufficiently high intensity, such chromophores change their absorption behavior. In the case of bacteriorhodopsin a structure change occurs which, after the illumination is switched off again, changes back to the starting state and switches the color of the chromophore between lilac and yellow. The integration of such chromophores into the layer system, for example the spacer layer, changes the absorption spectrum, with the switching behavior also occurring.

As a function of the quality of the adhesion on the carrier web or an optionally subjacent layer, this polymeric layer may show effects of decrosslinking, which leads to a characteristic macroscopic lateral structuring.

This structuring can be induced or specifically changed, for example through modification of the surface energy of the layers, for example through plasma treatment (in particular plasma functionalization), corona treatment, electron beam or ion beam treatment or through laser modification.

It is further possible to apply an adhesion promoter layer with regionally different surface energy.

The polymeric spacer layer 3 preferably has regions of different thickness. Through defined variation of the thickness (gradient, defined steps, defined structures) of the polymeric spacer layer a combination of different color shift effects is generated in a finished security feature (i.e., security element) (multicolor shift effect).

The thickness of the layer can therein be selectively varied within a wide range, for example in a range from 10 nm to 3 μm.

At a spacer layer thickness of more than approximately 3 μm the layer system no longer yields a color detectable by the human eye, but rather, depending on the mirror material, a somewhat darker metallic impression in comparison to the pure mirror. The reason is that the spectrum with increasing layer thickness becomes increasingly more complex (multipeak) and can no longer be resolved. However, for reading devices the spectrum continues to be well measurable and even highly characteristic, with the spacer layer thickness maximally to be measured depending on the resolution capability of the particular device. This represents a feasibility for generating an inconspicuous but machine-readable marking.

Further, when applying the polymeric spacer layer a certain defined layer thickness course can be set either in one application step or by applying several layers, which, again can be all-over or partial depending on the desired layer thickness course.

The layer thickness course can also be implemented in the form of a stepped structure, wherein onto a base layer different thicknesses of a further polymeric layer are partially applied.

It is further feasible to apply several layers of different polymers, for example polymers with different indices of refraction.

In a special embodiment at least one layer of the polymeric spacer layer can be comprised of a piezoelectric polymer, wherein here electrical properties can be demonstrated either through direct contacting or through an electric field. As a function of the thickness or of the thickness course or of the layer thickness change of the spacer layer, a characteristic interaction with electrical or electromagnetic fields can also be demonstrated through simple optical evidence (for example with the naked eye, optical photometer and/or spectrometer).

In a special embodiment, at least one layer of the polymeric spacer layer may comprise optically active structures, for example diffraction gratings, diffraction structures, holograms and the like, which can be molded into the polymeric spacer layer, preferably before complete curing. A corresponding method is for example disclosed in EP-A 1352732 A or EP-A 1310381.

The polymeric spacer layer 3 is preferably applied by means of a printing method, for example by gravure printing. The fine structure in the spacer layer transferred from the impression cylinder or the printing plate forms in this case an additional forgery-proof feature. Depending on the printing die, the composition of the lacquer of the polymeric spacer layer and the production parameters, this fine structure forms a forensic and/or visible security feature which permits the unique assignment to the production process (finger print).

Further, several different layer thicknesses of the polymeric spacer layer can for example be produced with a single cylinder. Due to the different thicknesses, different codes result. A further thickness region of the polymeric spacer layer is subsequently produced with a different cylinder, wherein optionally some codes may overlap. In the overlap region the same code can be produced with two different cylinders, whereby a further forensic and/or visible security feature is obtained and permits the unique assignment to the production process (finger print). The additional finger print is utilized either as a forensic feature (third level feature) or as an additional code substructure.

Polymeric spacer layers are preferably also utilized which exhibit choleristic behavior. Apart from liquid crystal polymers, in which this behavior can be generated, polymers with two intrinsic chiral phases, such as for example nitrocellulose also exhibit this. Through the specific excitation of the rare second phase of chirality, for example through mechanical or electromagnetic energy application (thermal, radiative) or by means of catalysts, through wavelength-selective polarization an additional characteristic security feature is generated. The cholesteric behavior can therein lead to a characteristic change of the color spectrum, which can be detected by a reading device.

Onto the polymeric layer is subsequently applied an all-over or partial layer formed of metal clusters 4. The metal clusters 4 may be comprised for example of aluminum, gold, palladium, platinum, chromium, silver, copper, nickel, tantalum, tin and the like or their alloys, such as for example Au/Pd, Cu/Ni or Cr/Ni. Preferably cluster materials can also be applied, for example semiconducting elements of the principal groups III to VI or the auxiliary group II of the periodic system of the elements, whose plasmon excitation can be triggered (for example through X-ray or ion radiation or electromagnetic interactions). When viewing with a suitable reading device, a change in the color spectrum (for example an intensity change) or a blinking of the color shift effect becomes thereby visible.

The cluster layer 4 can also have additional properties, for example electrically conductive, magnetic or fluorescing properties. For example a cluster layer of Ni, Cr/Ni, Fe or core shell structures with these materials or mixtures of these materials with the above listed cluster materials have such additional features. Through core shell structures inter alia fluorescing clusters can also be produced, for example by utilizing Quantum Dots® by Quantum Dot Corp.

The cluster layer 4 is applied all-over or partially, either precisely or partially congruent or offset with respect to the all-over or partial electromagnetic wave-reflecting layer.

The adhesion of the metal cluster 4 layer to the polymeric spacer layer 3 can preferably be adjusted with definition through the management of the application process of the cluster layer, such that at different adhesive strength evidence of manipulation through the destruction of the color effect is generated.

The lacquer of the spacer layer can also be set such that it has good adhesion to the metal (cluster, mirror) and not, however, to the base sheet. If this lacquer is printed over a partial Cu layer, the mirror layer is separated corresponding to the structuring of the cluster layer when detaching the element. Previously absolutely invisible evidence of manipulation is thereby formed.

This cluster layer 4 can be applied by sputtering (for example ion beam or magnetron) or vapor deposition (electron beam) or out of a solution, for example through adsorption.

In the production of the cluster layer in vacuum processes the growth of the clusters, and therewith their form as well as the optical properties, can advantageously be affected by setting the surface energy or the roughness of the subjacent layer. This changes in characteristic manner the spectra. This can take place, for example, through thermal treatment in the coating process or by preheating the substrate.

Further, these parameters can be selectively changed for example by treating the surface with oxidizing fluids, for example with Na hypochlorite or in a PVD or CVD process.

The cluster layer 4 can preferably be applied by means of sputtering. The properties of the layer, in particular the density and the structure, can therein be set especially through the power density, the quantity and composition of the gas utilized, the temperature of the substrate and the web transport rate.

For the application by means of methods of printing technology, after an optionally necessary concentration of the clusters, small quantities of an inert polymer, for example PVA, polymethylmethacrylate, nitrocellulose, polyester or urethane systems, are added to the solution. The mixture can subsequently be applied onto the polymeric layer by means of a printing method, for example screen printing, flexographic or preferably gravure printing, by means of a coating method, for example lacquer application, spraying, roll coating techniques and the like.

The mass thickness of the cluster layer is preferably 2-20 nm, and especially preferred 3-10 nm.

In one embodiment, onto the carrier substrate a so-called double-cluster system can be applied, wherein on both sides of the spacer layer one cluster layer each is provided. Beneath the first cluster layer a preferably black layer 8 is applied. This black background can either be applied by means of a method using vacuum technology, for example as nonstoichiometric aluminum oxide or also as printing ink by means of a suitable printing method, and the printing ink can comprise additional functional features, for example magnetic, electrically conductive feature and the like. As the black or dark background can further also serve a correspondingly dyed sheet.

By placing a black sheet onto a double cluster setup a simple optical demonstration can be carried out on site (simple testing means). For example, a double cluster feature can be inserted as a viewing window into a bank note, credit card or the like. The optical demonstration of the presence of the double cluster feature takes place by placing onto it a black sheet, for example of polycarbonate.

The clusters on both sides of the spacer layer can be applied in different thicknesses, can each be structured or be applied all-over and/or in a system of different materials.

If, for example, a polymeric spacer layer is utilized with a defined layer thickness course or a step structuring the metal clusters are deposited preferably and directly at the steps or at specific sites of the layer thickness course. This operation can be enhanced or diminished through suitable process management. For example, on microstructured surfaces different optical effects are generated than on smooth sheets. Thereby new (sub) codes result.

It is also possible to apply several layer sequences onto a carrier substrate, wherein, depending on the layout of the reflection layer (all-over or partial) and depending on the structuring of the spacer layers or layout of the cluster layer (all-over or partial, with register precision or overlapping with respect to the reflection layer) different color shift effects can be observed. For example, onto a reflection layer applied over the entire surface an optionally structured spacer layer can be applied, thereon a partial cluster layer, thereon, again, an optionally structured spacer layer, thereon, again, a preferably partial cluster layer, which is disposed so as to partially overlap the first cluster layer. Such sequences of spacer layer and cluster layer can usefully be repeated 2 to 3 times. Analogously, onto a partially applied reflection layer such systems can be applied, wherein here also, as a function of the layout of the partial reflection layer, again, different color shift effects are observed.

The layer system produced thus can subsequently be structured by means of electromagnetic radiation (for example light). Therein writing, letters, symbols, characters and signs, pictures, logos, codes, serial numbers and the like can be worked in for example by means of laser irradiation or laser gravure.

Through the appropriate selection of the radiative power either the layer system is partially destroyed or the thickness of the polymeric spacer layer is therein changed. The polymeric spacer layer usually swells in these regions, which generates a change of the color (peak shift to higher wavelengths). In contrast, the partial destruction brings about that the illuminated site either reflects metallically (separation of the electromagnetic wave-reflecting layer from the spacer layer) or that the material located behind the mirror becomes visible.

In this manner a specific structuring with colored, reflecting or colorless regions can be attained. The illumination power can, however, be selected such that exclusively the color effect is changed, wherein partial regions are generated with defined different colors (multicolor shift effect). Essential for the change is the energy actually absorbed by the layer system.

In a special embodiment, it is also possible to apply directly onto a carrier substrate, at least partially transparent in the visible spectral range, a cluster layer, onto this cluster layer subsequently, as described, a spacer layer and a further cluster layer is applied, wherein onto this cluster layer subsequently optionally a black layer, as already described, can be applied. Consequently, a so-called inverse layer system is obtained. (FIG. 4)

An inverse setup with a single cluster layer (application of the cluster layer onto the carrier substrate, subsequent application of the polymeric spacer layer and the electromagnetic wave-reflecting layer) can also be produced analogously, wherein the properties of the discrete layers correspond to the preceding description.

The carrier substrate can also already have one or several functional and/or decorative layers.

The functional layers can, for example, have certain electrical, magnetic, special chemical, physical and also optical properties.

To set electrical properties, for example conductivity, can be added for example graphite, carbon black, conductive organic or inorganic polymers, metal pigments (for example copper, aluminum, silver, gold, iron, chromium, lead and the like), metal alloys such as copper-zinc or copper-aluminum or their sulfides or oxides, or also amorphous or crystalline ceramic pigments such as ITO and the like. Further, doped or non-doped semiconductors such as for example silicon, germanium or ion conductors such as amorphous or crystalline metal oxides or metal sulfides can also be utilized as additives. Further, for setting the electrical properties of the layer can be utilized or added polar or partially polar compounds, such as tensides or nonpolar compounds such as silicon additives or hygroscopic or non-hygroscopic salts.

To set the magnetic properties paramagnetic, diamagnetic and also ferromagnetic substances such as iron, nickel and cobalt or their compounds or salts (for example oxides or sulfides) can be utilized.

The optical properties of the layer can be affected by visible color substances or pigments, luminescent color substances or pigments, which fluoresce or phosphoresce in the visible, the UV or in the IR range, effect pigments, such as liquid crystals, pearlescent pigments, bronzes and/or heat-sensitive colors or pigments. These can be employed in all conceivable combinations. In addition, phosphorescent pigments alone or in combination with other color substances and/or pigments can be utilized.

Several different properties can also be combined by adding different additives from the list above. For example, it is possible to used dyed and/or conductive magnetic pigments. All of the listed conductive additives can be employed.

Specifically for dying magnetic pigments all known soluble and insoluble color substances or pigments can be utilized. For example, through the addition of metals a brown magnetic color can be adjusted to have a metallic, for example silvery, color tone.

Moreover, insulator layers, for example, can be applied. Suitable insulators are for example organic substances and their derivatives and compounds, for example color substance and lacquer systems, for example epoxy, polyester, colophonium, acrylate, alkyd, melamine, PVA, PVC, isocyanate, urethane systems, which can be radiation-curing, for example by thermal or UV radiation.

Into one of the layers can be worked forensic features, which permit testing in the laboratory or with suitable testing means on site (optionally while destroying the features), for example DNA in NC lacquer, antigenes in acrylate lacquer systems. DNA can, for example, be adsorbed or bound to the clusters. Isotopes can also be added to the clusters or in the mirror material or be present in the spacer layer (for example Elemental Tag by KeyMaster Technologies, Inc.). As the spacer layer can be utilized for example a deuterated polymer (for example PS-d) or as the mirror a mirror material having low radioactivity.

These layers can be applied with known methods, for example by vapor deposition, sputtering, printing (for example gravure, flexographic, screen or digital printing and the like), spraying, electroplating, roller coating methods and the like. The thickness of the functional layer is 0.001 to 50 μm, preferably 0.1 to 20 μm.

The coated sheet produced thus can optionally also be additionally protected by a protective lacquer layer 6 or be further finished by lamination or the like.

The product can optionally be provided with a sealable adhesive, for example a hot or cold seal adhesive, or a self-adhesion coating, applied onto the corresponding carrier material, or be embedded for example during the paper production for security papers through conventional methods.

The coated carrier materials produced according to the invention can be utilized as security features in bank notes, data media, security documents, labels, markers, seals, in packagings, textiles and the like.

EXAMPLES

Example 1

Onto a polyester sheet having a thickness of 23 μm a Cr cluster layer of thickness 3 nm is applied in a sputter process. Onto this cluster layer in gravure printing with a specially optimized impression cylinder a urethane lacquer is imprinted in a thickness of 0.5 μm as a polymeric spacer layer. Thereupon follows again the deposition of a Cr cluster layer in a thickness of 3 nm. In finishing, onto this cluster layer is laminated a sheet dyed black. A color shift effect from violet to gold is observed.

Example 2

In the production of a thin-film system as in Example 1, portions of the layers are structured such that only with the register-precise superposition of a structured double cluster setup and a structured black background sheet, the shift color with an underlayed moiré pattern becomes visible. For this purpose the polymer layer in the double cluster setup is structured in the manner of a chessboard, with the edge length of the chessboard fields molded to be smaller than 0.1 mm. The blackening of the background sheet is structured with analogous chessboard fields. With the register-precise superposition of the structured sheets the molding of the moiré pattern as well as also the shift color can be observed. In this manner, through simple on site testing highest security can be ensured.

Example 3

In the production of a thin-film system as in Example 1, instead of the application of the second cluster layer through methods using vacuum technology, clusters are applied, which had been produced through chemical synthesis in solution and which are present as dispersion in solution. For this purpose such cluster-containing solutions are imprinted in very thin layers, or adsorbed out of the solution. If clusters are utilized, which additionally have further properties, additional security can be generated.

As powder-form cluster materials for imprinting, silver nanopowder by Argonide can be utilized. As magnetic cluster materials can be utilized magnetic pigments by Sustech. Best suited are ferrofluids or pigments in power form of the type: FMA (super paramagnetic ferrite) with hydrophilic coating. FMA mean primary particle size: 10 nm diameter.

As core shell clusters can be utilized SSPH (Sequential Solution Phase Hydrolysis) particles by Nanodynamics or nanopowders can be utilized. For example Au on $SnO_2$ or Au on $SiO_2$ particles with an inner diameter of 20 nm and an outer diameter of 40 nm can be utilized. As fluorescing particles the particles by Quantum Dot Corporation can be utilized: as core material CdS and as shell material ZnS. Core diameter: 5 nm; shell diameter: 2.5 nm.

Example 4

In an embodiment example an impression cylinder with different cell or well volumes in different regions over its width is produced. With this cylinder is imprinted onto a sheet covered with a uniform cluster layer the spacer layer. Due to the described implementation of the cylinder sharply delimited regions with defined different thicknesses of the spacer layer over the web width are obtained. Subsequently a uniform mirror layer of aluminum is vapor deposited. The bands with different color codes are subsequently separated in a slitting process. Thus, in one production run security elements with several different codes are produced.

Example 5

From a sheet web produced as described in Example 4 a security strip is cut from the web such that a sharp code transition comes to lie precisely in the center of the strip. In this case the strip thus produced contains as additional security stage two machine-readable codes, which singly or jointly are detected with the reading device.

Example 6

All of the described layer systems can be specifically and selectively structured by means of suitable lasers. In this example, by means of a 1064 nm Powerline laser by Rofin Sinar an inverse layer structure was partially destroyed at the lasered sites. The power was adjusted such that the laser causes the detachment of the polymeric spacer layer from the aluminum mirror layer, whereby the lasered sites no longer appear colored but rather show the metallic gloss of the mirror layer. The lasering is carried out selectively and punctiform. The depicted image is consequently composed of a dot matrix of metallically reflecting regions in the colored area. In this way, very rapidly (<1 sec) individualized, forgery-proof markings, for example for identification passes, can be produced.

Example 7

For the intrinsic marking of the layers described in the preceding examples marker substances can be utilized, which are only accessible to forensic proof. For this purpose, for example, to a nitrocellulose lacquer a marking of 1 per thousand solid DNA can be added to the lacquer volume. Under normal conditions (25, 80% ambient humidity) the DNA adsorbs firmly on the nitrocellulose and is thus stably anchored in the lacquer matrix. By dissolving the lacquer layer or by extraction with boiling water, the DNA can be extracted in the laboratory and be demonstrated with methods utilizing molecular biology. By using suitable DNA sequences, these can also be demonstrated on site, for example through a suitable hybridization assay.

The invention claimed is:

1. An anti-forgery security feature comprising:

at least one layer that reflects electromagnetic waves;

a polymeric spacer layer; and a layer formed of metallic clusters formed on the polymeric spacer layer, wherein one or more of the at least one layer that reflects electromagnetic waves, the polymeric spacer layer, and the layer formed of metallic clusters fulfills, in addition to their function in a color-tilting effect setup, security functions which are measurable in a fluorescent and/or electrically conductive and/or magnetic and/or forensic manner, each of the metallic clusters on the polymeric spacer layer that make up the layer formed of metallic clusters is a discrete cluster that is free from contact with any other of the metallic clusters on the polymeric spacer layer, and at least one of the metallic clusters of the layer formed of metallic clusters is made of a metal that is different from a metal of which at least one other of the metallic clusters of the layer formed of metallic clusters is made.

2. An anti-forgery security feature according to claim 1, wherein the at least one layer that reflects electromagnetic waves is a partial layer of separate sections, the polymeric spacer layer filling gaps between the separate sections of the at least one layer that reflects electromagnetic waves.

3. An anti-forgery security feature according to claim 1, wherein the polymeric spacer layer has a defined layer-thickness profile or a step design.

4. An anti-forgery security feature according to claim 1, wherein the polymeric spacer layer comprises a plurality of layers which can have different layer thicknesses or different layer-thickness profiles.

5. An anti-forgery security feature according to claim 1, wherein the polymeric spacer layer comprises a plurality of partial and/or full-area layers with different refractive indices.

6. An anti-forgery security feature according to claim 1, wherein the polymeric spacer layer is applied in the form of at least one of symbols, patterns, lines, and geometric shapes.

7. An anti-forgery security feature according to claim 1, wherein the polymeric spacer layer is made of a polymer with piezoelectric characteristics.

8. An anti-forgery security feature according to claim 1, wherein the polymeric spacer layer has one or more optically active structures.

9. An anti-forgery security feature according to claim 1, further comprising a carrier substrate having a transfer varnish layer.

10. An anti-forgery security feature according to claim 1, wherein a layer configuration of the anti-forgery security feature is individualized by way of an action of electromagnetic waves.

11. An anti-forgery security feature according to claim 10, wherein the layer configuration is individualized by way of laser treatment.

12. An anti-forgery security feature according to claim 10, wherein retrospective patterning is effected by way of the action of electromagnetic waves.

13. An anti-forgery security feature according to claim 12, wherein at least one of images, logos, writing, codes, and symbols are produced by way of the retrospective patterning.

14. An anti-forgery security feature according to claim 13, wherein regions with multiple colors or no color are achieved by way of the retrospective patterning.

15. An anti-forgery security feature according to claim 1, wherein, in the polymeric spacer layer, a fine structure of a printing tool can be identified as a feature which is assignable unambiguously.

16. An anti-forgery security feature according to claim 1, wherein the anti-forgery security feature is applied to a substrate, or is embedded in a substrate, wherein the substrate has, if appropriate, a recess which is overlaid by the anti-forgery security feature.

17. An anti-forgery security feature according to claim 1, wherein different color-tilting effects result from arranging a plurality of sequences of, if appropriate, differently patterned spacer layers and cluster layers over a full-area or partial reflection layer.

18. A use of the anti-forgery security feature according to claim 1 in the form of at least one of paper money, data carriers, valuable documents, packaging, labels, tags, and seals.

19. A method for checking the anti-forgery security feature according to claim 1, comprising detecting and identifying different identification features using suitable evaluation appliances, such as spectrometers and colorimeters, at suitable and different observation angles.

20. A method for checking the anti-forgery security feature according to claim 1, comprising detecting and identifying visually identification features.

21. A method for checking the anti-forgery security feature according to claim 1, comprising identifying in a laboratory or in situ forensic features such as DNA, isotopes or fine structure using suitable checking means.

22. A film material comprising:

a carrier substrate; and the anti-forgery security feature according to claim 1, including:

the least one layer that reflects electromagnetic waves;

the polymeric spacer layer; and the layer formed of metallic clusters, wherein the one or more of the at least one layer that reflects electromagnetic waves, the polymeric spacer layer, and the layer formed of metallic clusters fulfills, in addition to their function in the color-tilting effect setup, the security functions which are measurable in the fluorescent and/or electrically conductive and/or magnetic manner.

23. A film material according to claim 22, wherein the film is provided on one side or on both sides at least partially with a protective varnish layer.

24. A film material according to claim 23, wherein the protective varnish layer is pigmented.

25. A film material according to claim 23, wherein the film is provided on one side or on both sides at least partially with a sealable adhesive.

26. A film material according to claim 25, wherein the sealable adhesive is pigmented.

27. A method for producing an anti-forgery security feature, the method comprising:

applying at least one layer that reflects electromagnetic waves, and, subsequently, polymeric spacer layer of defined thickness to a carrier substrate using a printing cylinder which has a distinctive fine structure; and applying a layer formed of metallic clusters, which are formed using a vacuum-engineering method or from solvent-based systems, on the polymeric spacer layer, wherein one or more of the at least one layer that reflects electromagnetic waves, the polymeric spacer layer, and the layer formed of metallic clusters fulfills, in addition to their function in a color-tilting effect setup, security functions which are measurable in a fluorescent and/or electrically conductive and/or magnetic and/or forensic manner, each of the metallic clusters on the polymeric space layer that make up the layer formed of metallic clusters is a discrete cluster that is free from contact with any other metallic clusters on the polymeric spacer layer, and at least one of the metallic clusters of the layer formed of metallic clusters is made of a metal that is different from a metal of which at least one other of the metallic clusters of the layer formed of metallic clusters is made.

28. A method according to claim 27, wherein the applying of the layer formed of metallic clusters comprises applying the layer formed of metallic clusters, which are formed using the vacuum-engineering method or from the solvent-based systems, subsequently to the applying of the polymeric spacer layer of defined and, if appropriate, varying thickness, to the carrier substrate using the printing cylinder which has the distinctive fine structure, on which subsequently a partial or full-area layer that reflects electromagnetic waves and, on it, a further cluster layer are applied.

29. A method according to claim 27, further comprising applying a black background layer.

30. A method according to claim 27, wherein the polymeric spacer layer or a background layer is patterned.

31. A method according to claim 27, wherein the polymeric spacer layer or a background layer is patterned by way of laser treatment.

* * * * *